(12) United States Patent
Perry et al.

(10) Patent No.: US 6,488,426 B1
(45) Date of Patent: Dec. 3, 2002

(54) WRITING INSTRUMENT WITH FINGER GRIPPING DEVICE

(75) Inventors: Gordon Perry, New York, NY (US); Marc W. Lovejoy, Milford, CT (US); Craig M. Stevens, Bethany, CT (US); Roger F. Lockshier, Monroe, CT (US)

(73) Assignee: BIC Corporation, Milford, CT (US)

( * ) Notice: Subject to any disclaimer, the term of this patent is extended or adjusted under 35 U.S.C. 154(b) by 0 days.

(21) Appl. No.: 09/633,654

(22) Filed: Aug. 4, 2000

Related U.S. Application Data

(63) Continuation of application No. 09/048,280, filed on Mar. 26, 1998.

(51) Int. Cl.[7] .................. B43K 23/008; B43K 23/12
(52) U.S. Cl. ................ 401/6; 15/443; 401/88; 401/98; 401/99; 401/243
(58) Field of Search ................ 401/6, 88, 98, 401/99, 243; 15/443; D19/43, 48; 16/407, 430, 902, DIG. 18, DIG. 19

(56) References Cited

U.S. PATENT DOCUMENTS

| | | | | |
|---|---|---|---|---|
| 3,788,754 A | * | 1/1974 | Glasa | 401/135 |
| 3,813,729 A | * | 6/1974 | Szabo et al. | 16/119 |
| 4,035,089 A | * | 7/1977 | Schwartz et al. | 401/6 |
| 4,167,347 A | | 9/1979 | Hoyle | 401/88 |
| 4,522,522 A | | 6/1985 | Zeitelhack | 401/88 |
| 4,523,781 A | | 6/1985 | Brody | 294/1 |
| 4,601,598 A | | 7/1986 | Schwartz et al. | 401/6 |

(List continued on next page.)

FOREIGN PATENT DOCUMENTS

| | | | | |
|---|---|---|---|---|
| DE | 2157175 | * | 5/1973 | 401/6 |
| FR | 1253384 | * | 1/1961 | 401/6 |
| FR | 2622512 | * | 5/1989 | 401/6 |
| JP | 55-115884 | * | 8/1980 | 401/6 |
| JP | 57-24522 | * | 5/1982 | 401/6 |
| JP | 403292200 A | * | 12/1991 | 401/6 |
| JP | 403292200 A | | 12/1991 | 401/6 |

OTHER PUBLICATIONS

BT Office Products, GSA Federal Supply Schedule Contract No. GS–14F–0172D, p. 227, 1999.
Uni–ball Roller Grip Pen #60728; first consumer sale in Fall, 1998, approximate shipping date to retailer between Apr. 1, 1998 and Jul. 1, 1998.
Pilot Dr. Grip Retractable Ball Point Pen #36101; sale in Japan ca. 1995.
Schwan Stabilo Catalog 1992/93, 2 pages, 1992.
"BT Office Products 99", GSA Federal Supply Schedule Contract No. GS–14F–0172D, p. 227, 1999.*
"Schwan Stabilo Catalog 1992/93", 2 pages, 1992.*

*Primary Examiner*—Gregory Huson
*Assistant Examiner*—Kathleen J. Prunner
(74) *Attorney, Agent, or Firm*—Pennie & Edmonds LLP

(57) ABSTRACT

A writing instrument is provided including a gripping section arranged along a portion of the writing instrument normally used for gripping and a writing tip extending from the gripping section. The gripping section may be provided on a replaceable cartridge element which is inserted into a cartridge-receiving cavity in the writing instrument body. A soft, resiliently deformable gripping member is provided on the gripping section and is preferably tubular in shape. The gripping member includes a smooth surface which may include a slightly elevated or raised pattern. The elevated pattern may comprise a plurality of interconnected parts so as to form a continuous lattice or pattern such as hexagons. The pattern is preferably continuous over the entire smooth surface. The elevated pattern is resiliently compressible with respect to the smooth surface so that a user's fingers may deform the elevated pattern to provide additional traction during use.

35 Claims, 5 Drawing Sheets

U.S. PATENT DOCUMENTS

| | | | |
|---|---|---|---|
| D286,650 S | 11/1986 | Fischer | D19/55 |
| D298,439 S | 11/1988 | Rusk | D19/55 |
| 4,791,702 A * | 12/1988 | McVey | 16/114 B |
| 4,932,800 A | 6/1990 | Lin et al. | 401/6 |
| 5,000,599 A | 3/1991 | McCall et al. | 401/6 |
| D318,295 S | 7/1991 | Sze | D19/55 |
| 5,056,945 A | 10/1991 | Klodt | 401/6 |
| D324,236 S * | 2/1992 | Gomez | D19/48 |
| H1050 H | 5/1992 | Petrillo | 401/6 |
| D328,918 S | 8/1992 | Buda et al. | D19/49 |
| 5,143,463 A | 9/1992 | Pozil et al. | 401/6 |
| 5,186,564 A | 2/1993 | Fuhrmann, III et al. | 401/202 |
| D335,306 S | 5/1993 | Poisson et al. | D19/48 |
| 5,221,152 A | 6/1993 | Chuang | 401/57 |
| 5,230,578 A | 7/1993 | Fuhrmann, III et al. | 401/202 |
| D338,039 S * | 8/1993 | Takahashi | D19/51 |
| D338,915 S | 8/1993 | Willat | D19/51 |
| D341,622 S | 11/1993 | Poisson | D19/48 |
| D342,968 S | 1/1994 | Meinke | D19/55 |
| D358,170 S * | 5/1995 | Osada | 401/6 X |
| D359,757 S * | 6/1995 | Inami et al. | D19/51 |
| 5,468,083 A | 11/1995 | Chesar | 401/6 |
| 5,530,989 A * | 7/1996 | Remmert et al. | 16/110 R |
| 5,558,452 A * | 9/1996 | Oka et al. | 401/6 |
| D377,050 S | 12/1996 | Azeez | D19/49 |
| 5,599,127 A | 2/1997 | Fuhrmann, III et al. | 401/202 |
| D385,914 S * | 11/1997 | Shimizu | D19/48 |
| 5,735,622 A * | 4/1998 | Melnick et al. | 401/88 X |
| D395,674 S * | 6/1998 | Boix Gacia | D19/51 |
| 5,924,810 A * | 7/1999 | Rukan et al. | 401/209 |
| 5,988,909 A | 11/1999 | Luke, Jr. et al. | 401/6 |
| 6,056,462 A | 5/2000 | Fukai et al. | 401/6 |
| 6,062,753 A | 5/2000 | Hadtke et al. | 401/6 |

* cited by examiner

WRITING INSTRUMENT WITH FINGER GRIPPING DEVICE

CROSS-REFERENCE TO RELATED APPLICATION

The present application is a continuation application of U.S. patent application Ser. No. 09/048,280, filed Aug. 26, 1999 as a continuation prosecution application of application Ser. No. 09/048,280, filed Mar. 26, 1998.

TECHNICAL FIELD

The present invention relates generally to writing instruments such as ink pens, pencils, felt tip markers and the like. More specifically, this invention relates to a writing instrument having a gripping device thereon.

BACKGROUND OF THE INVENTION

Handwriting remains an important and useful skill and manual writing instruments remain important tools. Most writing instruments include an elongated tube containing a writing medium, such as ink or pencil lead, or highlighting medium, such as yellow, green and pink highlighters or the likes, and having an end at which the writing or highlighting medium is exposed for contact with the writing surface, such as paper. The elongated tube section of the writing instrument, which is grasped and held by the user when writing, is characterized typically by a smooth, exterior surface. The smooth surface may be attractive and pleasant to the touch, but it can be become slippery during use resulting in writer discomfort and impaired legibility of the handwritten text produced.

Devices are known in the prior art to assist a user in manually gripping a writing instrument. U,S. Pat. No. 4,601, 598 to Schwartz et al., U.S. Pat. No. 5,468,083 to Chesar, U.S. Pat. No. 4,167,347 to Hoyle, and U.S. Pat. No. 4,932, 800 to Lin et al. illustrate pen or pencil attachment devices which may be attached to the writing instrument in an attempt to reduce writer discomfort, cramp and fatigue, These writing aids are typically structures designed to fit over the exterior of a writing instrument. These independent structures which are slid onto the exterior of the instrument tend to be bulky and thick, and create a non-uniform surface constraining the user to hold the writing instrument in a fixed position.

Other structures have contoured grip surfaces constituting complex molded surfaces aimed at approximating the anatomical contours of a writer's fingertips during grasping of the writing instrument. However, the grip surfaces are not able to match the differing anatomical shapes and pen grasping techniques of different individuals.

U.S. Pat. No. 5,221,152 to Chuang discloses a writing instrument having a gripping segment on a section of the pen, which screws onto a portion of a main body of the writing Eminent. The gripping segment comprises a number of annular slip-preventing grooves axially disposed on its outer peripheral surface to help retain the instrument to the material or surface it is clipped to. It is not concerned with providing comfort and ease to the user of the instrument when writing.

U.S. Pat. No. 5,000,599 to McCall et al. discloses a writing instrument having a deformable gripping portion, which deforms in response to manual pressure during manual grasping of the instrument to permit reshaping of the gripping portion from an initial shape to a custom fit shape generally conforming to the writer's fingertips. The gripping portion retains the custom fit shape for a short period after release and returns substantially to its initial shape. During operation, the gripping portion requires pressure to be applied at the onset to conform the gripping portion to the shape desired by the user.

Thus, there remains a need to provide a gripping surface for a writing instrument which is consistent and uniform with the surface of the writing instrument, is comfortable and easy to use, provides a firm grip and does not require excessive pressure to conform the shape desired by the user.

SUMMARY OF THE INVENTION

These objects and advantages as well as other objects and advantages are accomplished in a writing instrument including an elongated cylindrical body preferably in the form of a cartridge element carrying a writing or highlighting medium therein and having a writing tip exposed at one end. The elongated body/cartridge element is insertable into a barrel member and may be permanently bonded to the barrel or releasably attached so that a replacement cartridge element may be inserted into the barrel member when the writing or highlighting medium therein is depleted.

In a preferred embodiment of the invention the elongated body/cartridge element includes a reduced cross-section thereon which forms an annular recessed tapered cavity. A gripping member is received by the cavity. The gripping member is preferably tubular in shape and is tapered to follow the tapered contour of the elongated body/cartridge element. The gripping member may be permanently attached to the annular recessed cavity by means of co-extrusion, two-component or two-step injection molding, or by chemical or mechanical bonding.

The gripping member has a smooth surface which may include a slightly elevated or raised pattern thereon. Preferably, the elevated pattern may be constructed in the form of hexagons having sides which are contiguous with neighboring hexagonal sections and are interconnected so as to form a continuous lattice or pattern of hexagons on the smooth surface. The pattern is preferably continuous over the entire smooth surface. Moreover, the pattern may be formed from shapes which are not connected, but which are disposed throughout the smooth surface.

The elevated pattern formed on the smooth surface provides friction between the gripping section and a user's fingers, and is resiliently compressible or deformable by the user's fingers for an improved grip. When in use, the writing instrument is grasped by a user at the gripping section. The gripping section provides a soft, textured and compressible or deformable surface which is comfortable to the touch and is not prone to slippage between the users thumb and fingers. Since the gripping surface is permanently attached to the body of the pen, the possibility of having the gripping member becoming loose during use is greatly reduced. In another aspect of the invention, a cap may be provided on the elongated body/cartridge element and fitted over the gripping member and the writing tip to cover same.

BRIEF DESCRIPTION OF THE DRAWINGS

Features of the present invention are disclosed in the accompanying drawings, wherein similar reference characters denote similar elements throughout the several views, and wherein.

DETAILED DESCRIPTION OF THE INVENTION

Figure 1:
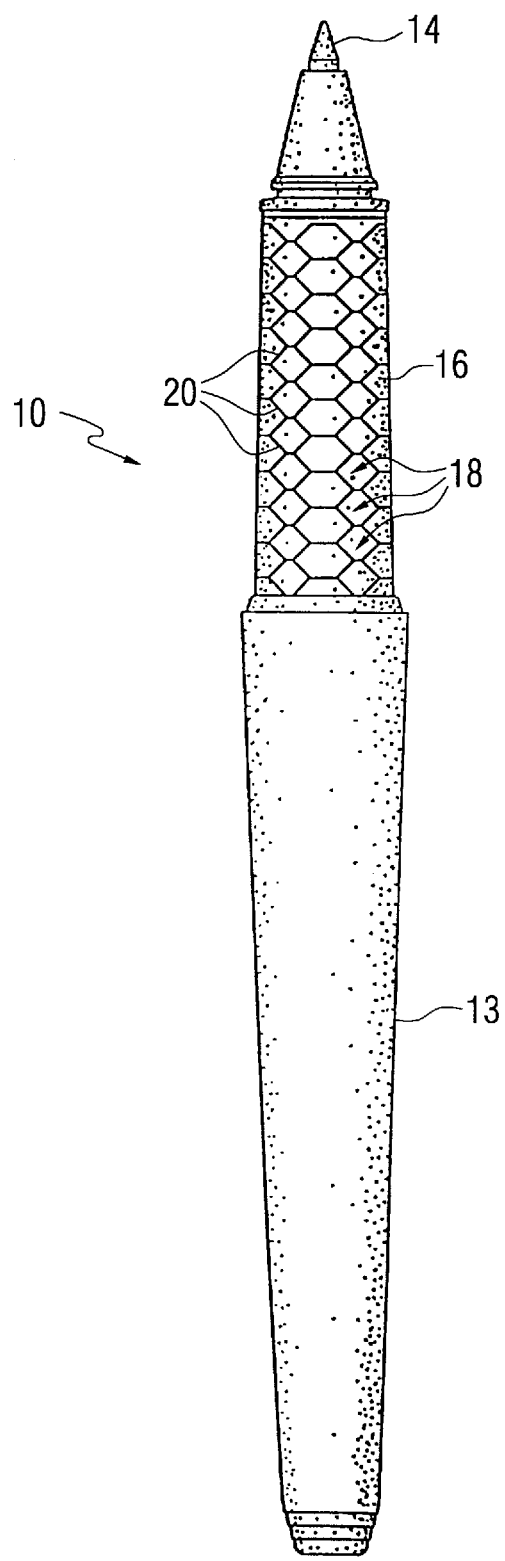
FIG. 1 is a front view of the writing instrument of the present invention showing the gripping section thereon.
Figure 2:
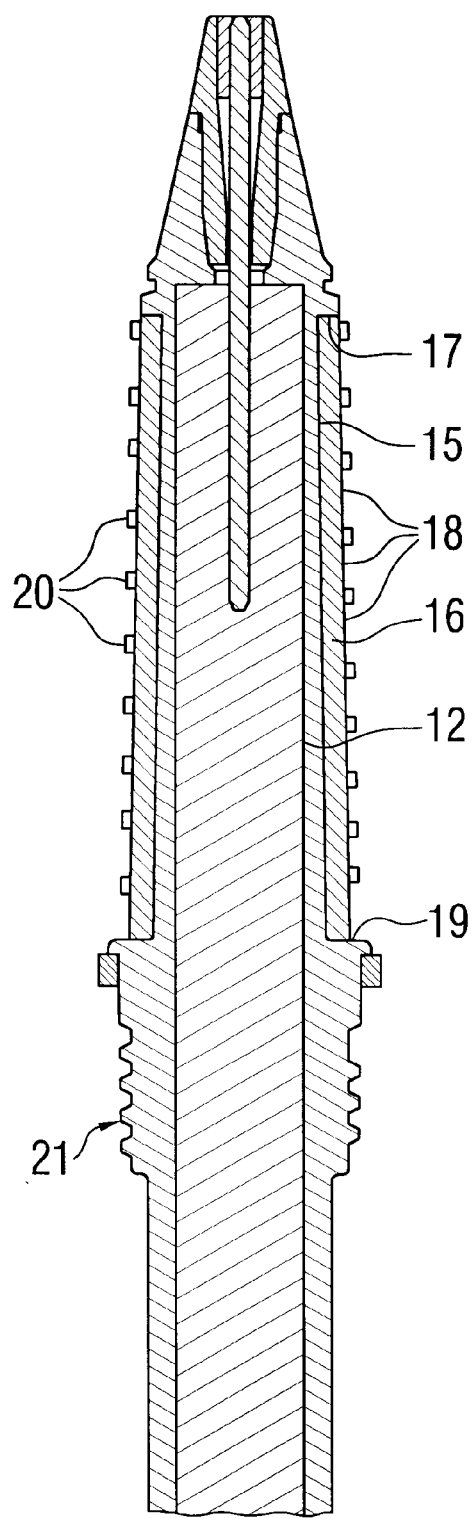
FIG. 2 is a partial sectional view of the writing instrument shown in FIG. 1 illustrating the features of the gripping section.
Figure 3:
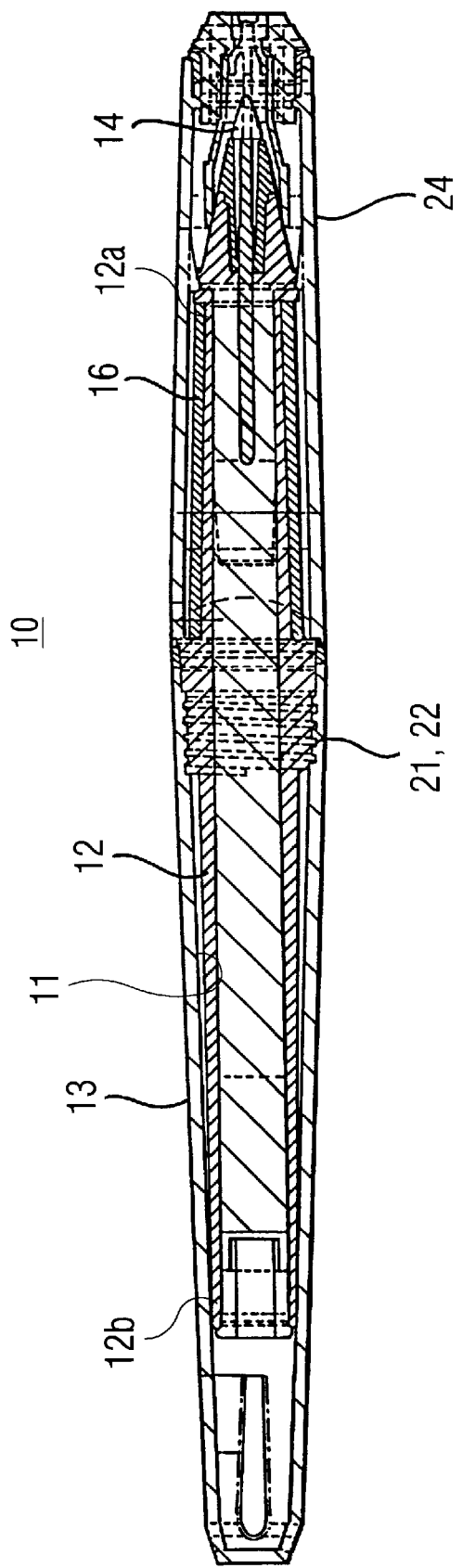
FIG. 3 is a sectional view of the writing instrument of FIG. 1 shown with a cap thereon.

Turning to FIGS. 1 through 3, an embodiment of a writing instrument 10 constructed in accordance with the present invention is shown with the understanding that those of ordinary skill in the art will recognize many modifications and substitutions which may be made to various elements.

Writing instrument 10 generally includes an elongated cylindrical body 12 preferably in the form of a cartridge element defining a reservoir carrying a writing or highlighting medium therein and having a writing tip 14 exposed at one end of the elongated body/cartridge element Elongated body/cartridge element 12 is insertable into a cartridge receiving cavity 11 in barrel member 13 and may be permanently bonded thereto or releasably attached to the barrel so that a replacement may be inserted into barrel member 13 when the writing highlighting medium therein is depleted, Methods of attachment include but are not limited to press fitting, snap fitting, chemical bonding and ultrasonic bonding. Additionally, it is preferred that elongated body/cartridge element 12 comprises threads 21, as shown in FIG. 2, configured and dimensioned to be received by corresponding internal threads 22 defined on the inside of barrel 13, as shown in FIG. 3, so that barrel 13 and elongated body/cartridge element 12 can be releasably attached to each other. Writing instrument 10 may also include a writing or highlighting medium that is retractable with respect to elongated body/cartridge element 12, so that the writing or highlighting medium may be selectively positioned outside cartridge element 12 when writing is desired and be retracted into cartridge element 12 for storage and transport, as depicted, for example, in FIG. 2.

As shown in FIG. 1, a gripping member 16 is provided on a portion of cartridge element 12 adjacent writing tip 14. In a preferred embodiment of the invention and as depicted in FIG. 2, elongated body/cartridge element 12 includes a reduced cross-section, which forms an annular recessed tapered cavity 15. Gripping member 16 is received in cavity 15 and is flush with a stepped member 17 on body 12 As shown stepped member 17 has a diameter that is slightly less than the diameter of raised section 19 of body 12, such that raised section 19 can facilitate the insertion of a cap, as discussed below. Preferably, gripping member 16 is suitably dimensioned and shaped to fit smoothly within recess 15 of elongated body/cartridge element 12. Gripping member 16 is also preferably tubular in shape and is tapered to follow the tapered contour of elongated body/cartridge element 12. Thus, as will be appreciated, a tubular gripping member 16 preferably has a smooth interior surface to fit smoothly within recess 15 as illustrated in FIG. 2. Preferably, gripping member 16 is fabricated of a thermoplastic elastomer, including but not limited to polypropylene, rubber, polyurethane, polyisobutylene, polybutadiene. Moreover, in order to provide comfort and ease during operation of the writing instrument, it is important that gripping member 16 be of a suitable softness, preferably softer than the elongated body/cartridge element 12 Preferably, the hardness of the material of gripping member 16 is in the range of Shore A hardness of 3 to 40 durometer, and more preferably in the range of 3 to 25 durometer, and most preferably in the range of 3 to 15 durometers. However, the gripping member may also have a hardness of less than 3 durometer.

Figure 7:
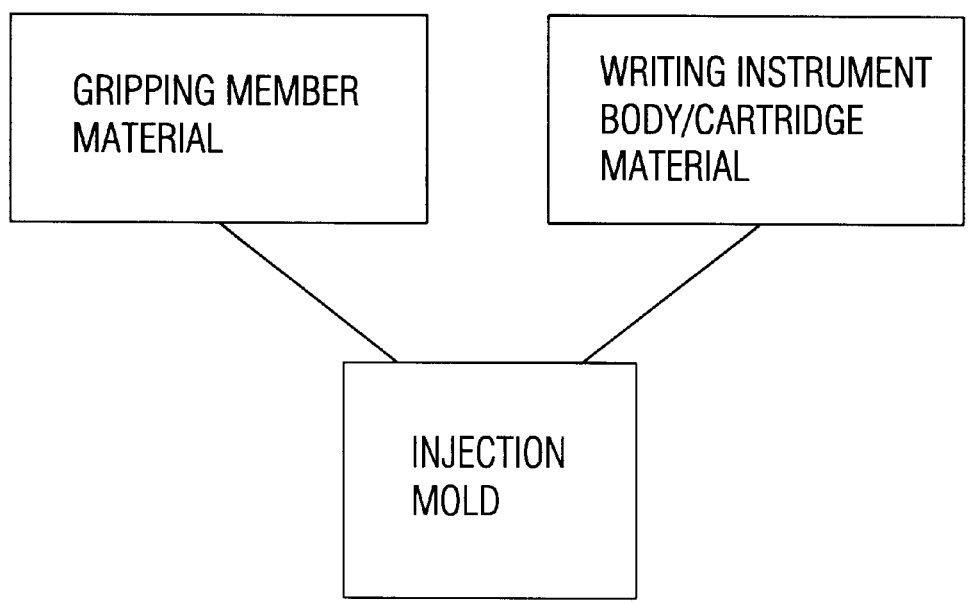
FIG. 7 is a block diagram schematically showing a method of co-injection or two-component or two-step injection molding a writing instrument with a gripping member.

Elongated body 12 has a first end 12a and a second end 12b. Preferably, gripping member 16 is adhered to elongated body 12 at a position between first end 12a and second end 12b. Gripping member 16 is adhered to elongated body/cartridge element 12 by kinetic, ultrasonic or laser welding. Alternative methods of adhering gripping member 16 to elongated body/cartridge element 12 include but are not limited to solvent bonding and co-injection molding. The gripping member and the elongated body/cartridge element may also be manufactured by a two-component or two-step injection molding process, which produces a chemical bond between these two members A co-injection or two-component or two-step injection molding process is schematically illustrated in FIG. 7 As understood by one of ordinary skill in the art, such methods of adhering gripping member 16 to elongated body/cartridge element 12 are other than by curing.

Gripping member 16 has a smooth surface 18 which may include a slightly elevated or raised pattern thereon. Preferably, the pattern comprises a plurality of slightly elevated sections 20. As shown in FIG. 1, elevated sections 20 are in the form of hexagons having sides which are contiguous with neighboring hexagonal sections and interconnected so as to form a continuous lattice or pattern of hexagons on smooth surface 18. The pattern is preferably continuous over the entire smooth surface 18. The elevated pattern 20, which preferably has less surface area than the smooth surface 18, is of sufficient height to be resiliently compressible or deformable by the user's fingers, so that additional traction between the gripping member and the user's fingers is provided in addition to the friction between the gripping member and the user's fingers. Moreover, the pattern may be formed of shapes which are not connected, but which are disposed continuously throughout smooth surface 18.

When in use, the writing instrument is grasped by a user at the gripping section. The gripping section provides a soft, textured and compressible surface which is resiliently deformable and is therefore not prone to slippage between the user's thumb and fingers Since the gripping surface is permanently attached to the body of the pen the possibility of having the gripping member becoming loose during use is greatly reduced. The thickness of gripping member 16 is preferably in the range of 0.50 to 2.0 mm as measured from smooth surface 18 to elevated sections 20. The elevated pattern 20 is preferably in the range of 0.1 to 0.5 mm as measured from smooth surface 18.

As shown in FIG. 3, another aspect of the invention includes a cap 24 provided on elongated body/cartridge element 12, which is dimensioned to fit over at least a portion of gripping member 16 and writing tip 14 to cover the same. Preferably, cap 24 cooperates with raised section 19 to ensure a tight connection between cap 24 and cartridge element 12. Gripping member 16 is of sufficient size, shape and thickness to provide a comfortable, flexible surface having anti-slip properties. It is not bulky to grip, is able to fit neatly on cartridge element 12 and can be easily covered by cap 24.

Figure 4:
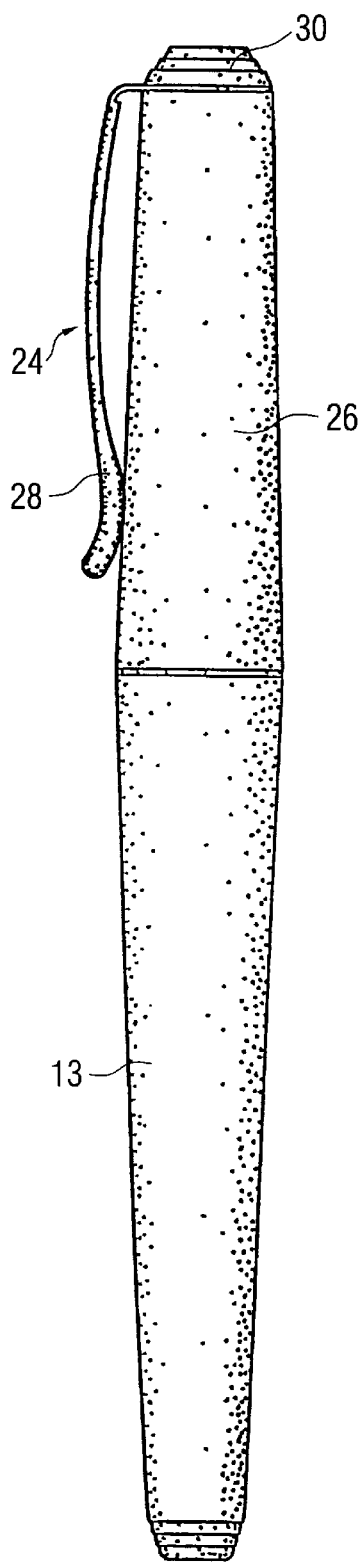
FIG. 4 is a front view of the writing instrument shown in FIG. 1 with the cap.
Figure 5:
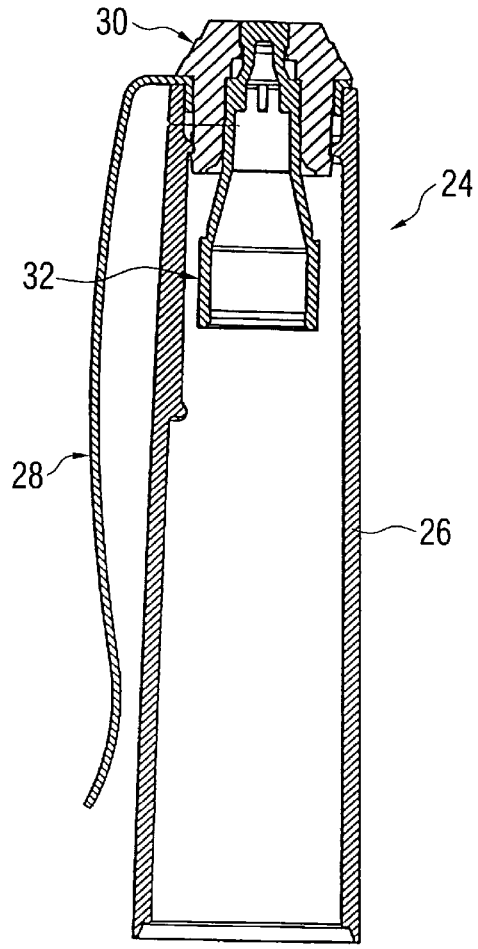
FIG. 5 is a cross-sectional view of the cap.
Figure 6:
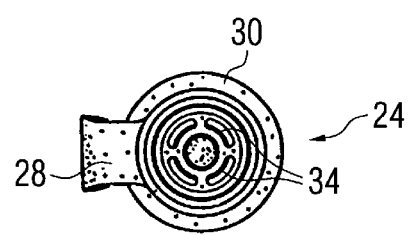
FIG. 6 is a top view of the cap.

Referring to FIGS. 4–6, writing instrument 10 is shown with cap 24. Cap 24 is configured and dimensioned to be releasably attached to elongated body/cartridge element 12. Cap 24 protects writing tip 14 when the writing instrument 10 is not in use, and it also isolates the ink from writing tip 14 from contaminating the surrounding areas. Cap 24 comprises a hollow body 26 defining an open end, clip member 28, vented plug 30 and well 32. When not in use writing tip 14 is inserted into well 32, which is preferably attached to vented plug 30 by snap fitting, threading, chemical bonding or ultrasonic bonding. Well 32 can also be formed integrally with vented plug 30. Plug 30 defines a plurality of apertures 34 therein such that air communication is established between the interior of cap 24 and the outside environment through plug 30.

The writing instrument of the present invention may be manufactured by providing a elongated body/cartridge element having a writing or highlighting medium therein and a writing tip thereon. A tubular shaped gripping member is provided and is adhered to the elongated body/cartridge element by a two-component or two-step injection molding process to chemically bond the gripping member to the elongated body/cartridge element Alternatively, the gripping member may be mechanically bonded to the elongated body/cartridge element by laser or ultrasonically welding or solvent bonding the member to the elongated body/cartridge element.

While various descriptions of the present invention are described above, it should be understood that the various features can be used singly or in any combination thereof. Therefore, this invention is not to be limited to only the specifically preferred embodiments depicted herein.

Further, it should be understood that variations and modifications within the spirit and scope of the invention may occur to those skilled in the art to which the invention pertains. Accordingly, all expedient modifications readily attainable by one versed in the art from the disclosure set forth herein that are within the scope and spirit of the present invention are to be included as further embodiments of the present invention. The scope of the present invention is accordingly defined as set forth in the appended claims.

What is claimed is:

1. A method of assembling a writing medium to a writing instrument, said method comprising inserting a cartridge element defining a reservoir carrying a writing or highlighting medium therein into a cartridge receiving cavity in a barrel member, said cartridge element having a writing tip thereon exposed at one end of said cartridge element and an elastomeric gripping member on a portion of said cartridge element adjacent said writing tip.

2. The method of claim 1, wherein said gripping member is positioned in a recessed cavity formed in said portion of said cartridge element adjacent said writing tip and is carried by said cartridge element upon removal of said cartridge element from said barrel member.

3. The method of claim 1, wherein said cartridge element has first and second ends and said writing tip is formed at said first end, and said method further comprises:
   inserting said second end of said cartridge element into said cartridge receiving cavity; and
   placing a cap over said writing tip.

4. The method of claim 3, wherein placing a cap over said writing tip further includes covering said gripping member with said cap.

5. The method of claim 1, further comprising replacing said cartridge element, when the writing or highlighting medium carried by said cartridge element is depleted, with another cartridge element carrying writing or highlighting medium therein and having a writing tip thereon exposed at one end of said another cartridge element and a gripping member adjacent said writing tip.

6. The method of claim 1, further comprising attaching said cartridge element to said barrel member by one of press fitting, snap fitting, chemical bonding, ultrasonic bonding, or threaded engagement of said cartridge element to said barrel member.

7. The method of claim 1, further comprising providing said writing or highlighting medium for selective positioning between a position outside said cartridge element when writing is desired and a position inside said cartridge element for storage and transport.

8. A writing instrument comprising:
   an elongated body; and
   a gripping member fabricated of a thermoplastic elastomer, the gripping member having a smooth interior surface fitted on and adhered, other than by curing, to a portion of said elongated body normally used for gripping by a user.

9. A writing instrument as in claim 8, wherein said gripping member is fabricated of a material which is softer than the material of said elongated body.

10. A writing instrument as in claim 8, wherein the material of said gripping member has a Shore A hardness in the range of less than 40.

11. A writing instrument as in claim 10, wherein:
   said gripping member fits within a recess in said elongated body;
   said elongated body has first and second ends;
   said recess has first and second ends positioned between said first and second ends of said elongated body and is positioned closer to said first end of said elongated body than to said second end of said elongated body.

12. A writing instrument as in claim 11, wherein said gripping member has a smooth interior surface to fit smoothly within said recess.

13. A writing instrument as in claim 8, wherein said gripping member is made from a material having a Shore A hardness of less than 3 durometer.

14. A writing instrument as in claim 8, wherein said gripping member is tubular.

15. A writing instrument as in claim 8, wherein said gripping member is adhered to said elongated body by one of welding, solvent bonding, or a co-injection or two-step or two-component injection molding process.

16. A writing instrument as in claim 8, wherein said gripping member further comprises a raised pattern which is resiliently deformable and therefore is not prone to slippage between the user's thumb and fingers.

17. A writing instrument as in claim 8, wherein said gripping member has a thickness in the range of less than 2.0 mm.

18. A writing instrument as in claim 17, wherein said gripping member has a smooth outer surface and further includes a plurality of elevated sections raised in the range of 0.1 to 0.5 mm above said smooth surface.

19. A writing instrument as in claim 8, wherein said gripping member provides a flexible surface having anti-slip properties.

20. A writing instrument as in claim 8, further comprising a cap, wherein said gripping member is configured and dimensioned to be received by said cap.

21. A. writing instrument comprising:
   an elongated body; and
   a gripping member positioned on a portion of said elongated body normally used for gripping by a user and having a smooth surface including an elevated pattern, wherein said elevated pattern is of sufficient height to be resiliently deformable by the user's fingers to provide additional traction between said gripping member and the user's fingers in addition to the friction between the gripping member and the user's fingers.

22. A writing instrument as in claim 21, wherein said elevated pattern comprises a plurality of elevated sections.

23. A writing instrument as in claim 22, wherein said elevated sections are in the form of hexagons.

24. A writing instrument as in claim 23, wherein said hexagons are interconnected so as to form a continuous lattice.

25. A writing instrument as in claim 22, wherein said elevated pattern is formed of unconnected shapes.

26. A writing instrument as in claim 25, wherein said shapes are disposed continuously throughout said smooth surface.

27. A writing instrument as in claim 21, wherein said elevated pattern has less surface area than said smooth surface.

28. A writing instrument as in claim 21, wherein said elevated pattern is preferably in the range of 0.1 to 0.5 mm as measured from said smooth surface.

29. A writing instrument as in claim 28, wherein said elevated pattern is continuous over the entire smooth surface.

30. A writing instrument comprising an elongated body defining a reservoir carrying a writing or highlighting medium therein, said elongated body having first and second ends with an elastomeric gripping member permanently adhered therebetween at a portion of said elongated body normally used for gripping by a user, wherein:

a Kiting tip is exposed at said first end of said elongated body;

said elongated body is releasably attached to a barrel member of said writing instrument; and said gripping member has a smooth interior surface.

31. A writing instrument as in claim 30, wherein said elongated body is configured for releasable attachment to said barrel member of said writing instrument by one of press fitting, snap fitting, and threaded engagement.

32. A writing instrument as in claim 30, wherein said gripping member has a Shore A hardness of less than 40 durometer.

33. A writing instrument as in claim 30, wherein said elongated body is configured such that a writing or highlighting medium is selectively positionable between a position outside said elongated body when writing is desired and a position inside said elongated body for storage and transport.

34. A writing instrument as in claim 30, wherein said gripping member is fabricated of a thermoplastic elastomer.

35. A writing instrument comprising:

an elongated writing instrument body; and a solid, resiliently deformable gripping member made from a soft material having a Shore A hardness of less than 3 durometer and adhered over a portion of said elongated body normally used for gripping by a user, said gripping member having a thickness in the range of less than 2.0 mm.

\* \* \* \* \*

UNITED STATES PATENT AND TRADEMARK OFFICE
CERTIFICATE OF CORRECTION

PATENT NO.    : 6,488,426 B1
DATED         : December 3, 2002
INVENTOR(S)   : Perry et al.

It is certified that error appears in the above-identified patent and that said Letters Patent is hereby corrected as shown below:

Column 8,
Line 1, "a Kiting tip" should be amended to -- a writing tip --

Signed and Sealed this

Twenty-fifth Day of March, 2003

JAMES E. ROGAN
*Director of the United States Patent and Trademark Office*